US009911310B2

(12) United States Patent
Neumeyer et al.

(10) Patent No.: US 9,911,310 B2
(45) Date of Patent: *Mar. 6, 2018

(54) SYSTEM AND METHOD FOR LOCATING A HEARING AID

(71) Applicant: III Holdings 4, LLC, Wilmington, DE (US)

(72) Inventors: Frederick Charles Neumeyer, Austin, TX (US); Gregory Charles Yancey, Austin, TX (US)

(73) Assignee: III HOLDINGS 4, LLC, Wilmington, DE (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/496,014

(22) Filed: Sep. 25, 2014

(65) Prior Publication Data
US 2015/0010178 A1 Jan. 8, 2015

Related U.S. Application Data

(63) Continuation of application No. 13/708,140, filed on Dec. 7, 2012, now Pat. No. 9,191,756.

(60) Provisional application No. 61/583,902, filed on Jan. 6, 2012.

(51) Int. Cl.
*H04B 7/00* (2006.01)
*G08B 21/24* (2006.01)
*H04R 25/00* (2006.01)
*H04W 4/00* (2018.01)
*H04W 4/02* (2018.01)

(52) U.S. Cl.
CPC ............. *G08B 21/24* (2013.01); *H04R 25/30* (2013.01); *H04R 25/554* (2013.01); *H04W 4/008* (2013.01); *H04W 4/02* (2013.01); *H04R 2225/55* (2013.01); *H04R 2460/07* (2013.01); *H04R 2499/11* (2013.01)

(58) Field of Classification Search
CPC ....... H04W 4/008; H04W 4/025; H04W 4/02; H04R 25/554
USPC ......................................................... 455/41.2
See application file for complete search history.

(56) References Cited

U.S. PATENT DOCUMENTS

| 5,793,290 | A  | 8/1998  | Eagleson et al. |
| 7,274,292 | B2 | 9/2007  | Velhal et al. |
| 7,973,657 | B2 | 7/2011  | Ayed et al. |
| 8,115,609 | B2 | 2/2012  | Ketari et al. |
| 8,391,793 | B2 | 3/2013  | Price et al. |
| 8,508,363 | B2 | 8/2013  | Raniere et al. |

(Continued)

FOREIGN PATENT DOCUMENTS

| GB | 2473664 B     | 1/2012 |
| WO | 2010073749 A1 | 7/2010 |

OTHER PUBLICATIONS

Office Action for U.S. Appl. No. 13/708,140, mailed on Oct. 6, 2014, Neumeyer et al., "System and Method for Locating a Hearing Aid", 5 pages.
Final Office Action for U.S. Appl. No. 14/496,014, mailed on Feb. 10, 2015, Frederick Charles Neumeyer, "System and Method for Locating a Hearing Aid", 8 pages.
Final Office Action for US Patent Application dated Apr. 5, 2015, Frederick Charles Neumeyer, "System and Method for Locating a Hearing Aid", 9 pages.
United States Patent and Trademark Office, Final Office Action, U.S. Appl. No. 13/708,140, mailed Apr. 6, 2015, 10 pages.

(Continued)

*Primary Examiner* — Eugene Yun
(74) *Attorney, Agent, or Firm* — Polsinelli PC

(57) ABSTRACT

A smart phone including a computer readable storage medium to store a hearing aid locator application and a processor coupled to the computer readable storage medium to execute the hearing aid locator application to track a last known location of a hearing aid.

16 Claims, 4 Drawing Sheets

(56) References Cited

U.S. PATENT DOCUMENTS

| | | |
|---|---|---|
| 8,526,649 B2 | 9/2013 | Foo et al. |
| 8,810,392 B1 | 8/2014 | Teller et al. |
| 9,191,756 B2 | 11/2015 | Neumeyer et al. |
| 2003/0008659 A1 | 1/2003 | Waters et al. |
| 2004/0130448 A1 | 7/2004 | McDonald et al. |
| 2005/0231375 A1 | 10/2005 | Kingston et al. |
| 2008/0101635 A1* | 5/2008 | Dijkstra et al. ............... 381/315 |
| 2008/0240453 A1 | 10/2008 | Westergaard et al. |
| 2009/0207014 A1 | 8/2009 | Ayed et al. |
| 2010/0027822 A1 | 2/2010 | Dietz |
| 2011/0171937 A1 | 7/2011 | Hill et al. |
| 2013/0178162 A1* | 7/2013 | Neumeyer et al. .......... 455/41.2 |
| 2013/0301860 A1 | 11/2013 | Neumeyer et al. |
| 2014/0191864 A1 | 7/2014 | Ghazarian et al. |
| 2014/0206307 A1 | 7/2014 | Maurer et al. |
| 2015/0172835 A1 | 6/2015 | Sacha et al. |
| 2015/0229782 A1 | 8/2015 | Zuidema et al. |
| 2015/0296310 A1 | 10/2015 | Chen et al. |
| 2016/0189523 A1 | 6/2016 | Neumeyer et al. |

OTHER PUBLICATIONS

United States Patent and Trademark Office, Notice of Allowance, U.S. Appl. No. 13/708,140, mailed Jul. 17, 2015, 8 pages.
United States Patent and Trademark Office, Non-Final Office Action, U.S. Appl. No. 15/063,425, mailed Jul. 5, 2016, 16 pages.
United States Patent and Trademark Office, Final Office Action, U.S. Appl. No. 15/063,425, dated Dec. 12, 2016, 8 pages.

* cited by examiner

SYSTEM AND METHOD FOR LOCATING A HEARING AID

CROSS-REFERENCE TO RELATED APPLICATION(S)

This application is a continuation of U.S. application Ser. No. 13/708,140, filed on Dec. 7, 2012 and entitled "System and Method for Locating a Hearing Aid" (now U.S. Pat. No. 9,191,756), which is a non-provisional of and claims priority to Provisional Application No. 61/583,902 filed on Jan. 6, 2012 and entitled "System and Method for Locating a Hearing Aid," the entirety of which is incorporated herein by this reference thereto.

FIELD

This disclosure relates generally to hearing aids, and more particularly to a system for location lost hearing aids.

BACKGROUND

Hearing deficiencies can range from partial to complete hearing loss. Often, an individual's hearing ability varies across the range of audible sound frequencies, and many individuals have hearing impairment with respect to only select acoustic frequencies. For example, an individual's hearing loss may be greater at higher frequencies than at lower frequencies.

Hearing aids have been developed to alleviate the effects of hearing losses in individuals. In instances where the individual's hearing loss varies across frequencies. Conventionally, hearing aids range from ear pieces configured to amplify sounds to more sophisticated hearing aid devices that are configurable by a hearing health professional.

While hearing aids are often effective at compensating for the effects of hearing loss, hearing aids are expensive, small, and easy to lose. Unfortunately, lost hearing aids are often not covered by insurance. Thus the loss of a hearing aid can severely impact the quality of life of the individual, especially if they are unable to replace it.

Replacing a hearing aid can often cost the user thousands of dollars. Unfortunately, losing a hearing aid is a common occurrence. It is possible to purchase replacement plans, however, the replacement plans; while not as expensive as a new hearing aid, often cost hundreds of dollars, charge a replacement fee in addition to the plan fees, and require the user to go a period of time without the use of the lost hearing aid.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

Embodiments of a system are described below that include a portable or hand held electronic device (such as a cell phone, smart phone, personal digital assistant (PDA), tablet computer, or other portable computing system) that is configured to communicate with the hearing aid. In one embodiment, the hearing aid communicates with the electronic device through a wireless communication channel. The electronic device tracks the current location of the hearing aid while the communication channel is maintained. The electronic device executes an application that runs in the background and checks the current location of the electronic device using a global positioning system (GPS) at the time the electronic device receives communication from the hearing aid. The GPS coordinates are then stored as the last known location of the hearing aid the memory of the electronic device.

The electronic device communicates with the hearing aid via a short range wireless protocol (such as Bluetooth®) and uses a GPS circuit to determine the current location of the electronic device and to infer the last known location of the hearing aid from the electronic device's current location. Further, the application allows the user to access the last known location of the hearing aid as needed, allowing the user to determine a location where he/she may have lost the hearing aid.

For example, it is common for a motorcyclist to have his/her hearing aid blown off his/her ear while riding. The application and the electronic device can be used by the motorcyclist to check the last known location and time that the electronic device communicated with the hearing aid and determine a finite area in which the hearing aid is likely located. Further, the application may be configured to re-establish communication with the hearing aid when it enters the transceiver's range and to alert the user when the communication is re-established. Thus letting the motorcyclist know that the hearing aid is close.

In one instance, the electronic device may provide an indication of closeness by measuring the signal strength of the communication between the hearing aid and the electronic device. For example, the electronic device may beep at an increased pace the stronger the signal becomes, or provide various visual indications of closeness responsive to the signal strength. In another embodiment, the electronic device may provide a signal to the hearing aid when the electronic device is brought back into communication range. For example, the electronic device may cause the hearing aid to play a tone (such as a tone in the user's known good range of hearing) or melody when in range. In another example, the electronic device may cause the hearing aid to turn on a light emitting diode (LED) to help enable the user to locate the hearing aid.

Figure 1:
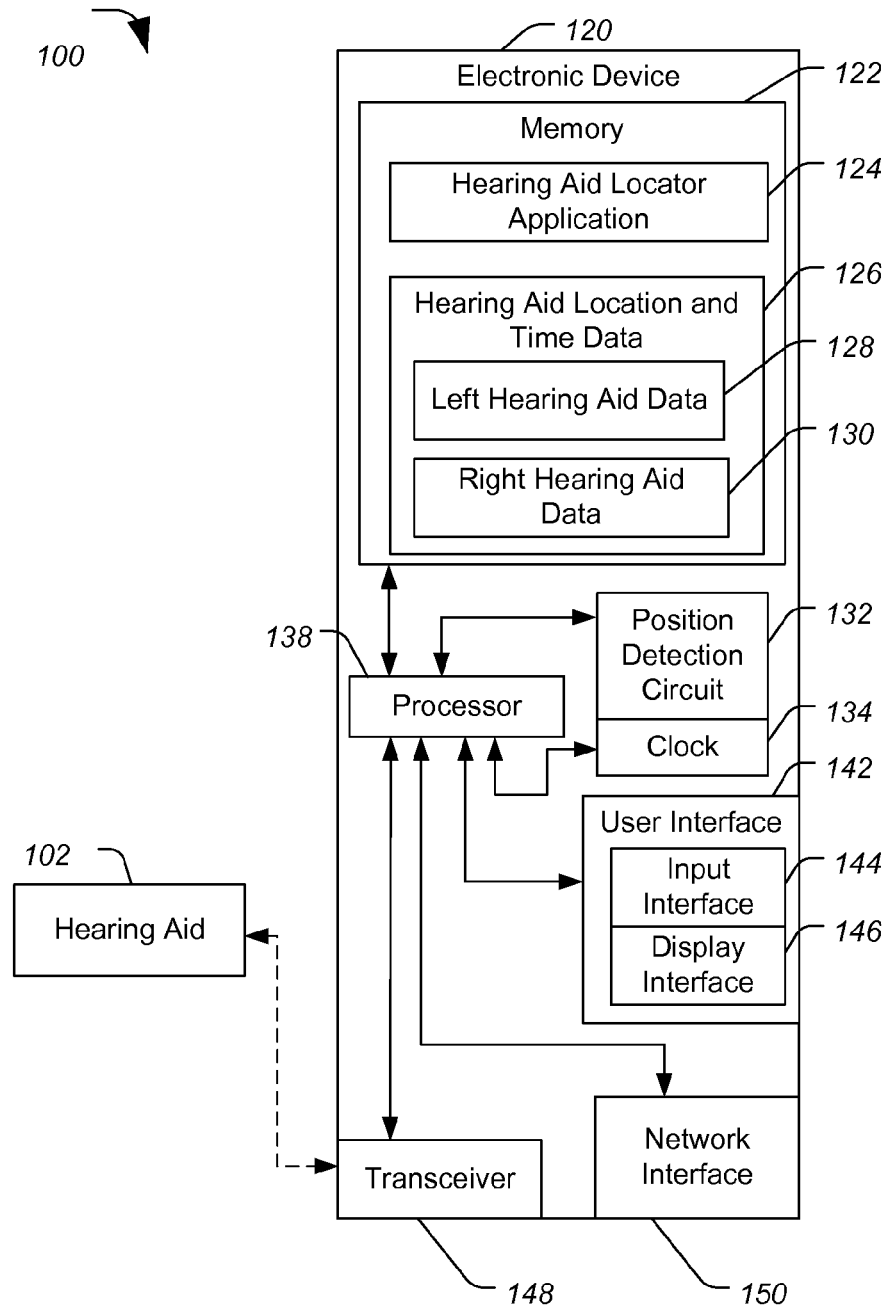
FIG. 1 is a block diagram of a system including a hearing aid that communicates with an electronic device.

FIG. 1 is a block diagram of a system 100 including a hearing aid 102 configured to communicate with an electronic device 120 that is configured to determine the last known location of hearing aid 102. Electronic device 120 is a portable or handheld electronic device that a hearing aid user may use to control the operations of hearing aid 102. Electronic device 120 may be a cell phone, a smart phone, personal digital assistant (PDA), a tablet computer, or another type of portable computing system.

Electronic device 120 includes a transceiver 148 and a network interface 150. Transceiver 148 is a radio frequency transceiver configured to communicate with hearing aid 102 through a short range wireless communication channel, such as a Bluetooth®. Network interface 150 is configured to send and receive data over a network (not shown). Electronic device 120 also includes a user interface 142, which includes a display interface 146 (such as a liquid crystal display or LCD) to display information to a user and include an input interface 144 (e.g., a keypad, a keyboard, a pointer, a touch screen, or another type of interface) to receive user input. In some embodiments, display interface 146 and input interface 144 are combined in a single component, such as in a touch screen on a smart phone.

Electronic device 120 also includes a processor 138 coupled to transceiver 148, network interface 150, and user interface 142. Processor 138 is further coupled to a position detection circuit 132 and a clock 134. In an example, position detection circuit 132 can be a GPS circuit, a circuit configured to triangulate position data based on cell phone towers, or other types of location detecting circuits. Position detection circuit 132 and clock 134 are configured to provide location and time data to processor 138. Electronic device 120 also includes a memory 122, which is accessible to processor 138 and configured to store hearing aid locator application 124 and hearing aid location and time data 126. Hearing aid location and time data 126 may optionally include left hearing aid data 128 and right hearing aid data 130 if the user has two hearing aids.

Memory 122 is a computer readable storage medium which includes volatile and non-volatile, removable and non-removable media implemented in any method or technology for storage of information such as computer readable instructions, data structures, program modules, or other data. Computer readable storage medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by the computing device.

In an embodiment, processor 138 executes hearing aid locator application 124, which causes electronic device 120 to establish communication with hearing aid 102. In response to establishing communication, electronic device 120 determines a current time and a current location using position detecting circuit 132 and processor 138 stores the current time and current location in memory 122 as hearing aid location and time data 126, respectively. If a right and a left hearing aid are both are in communication with electronic device 120, electronic device 120 stores the current time and current location for both the left and right hearing aids, as left hearing aid data 128 and right hearing aid data 130.

Once communication is established between hearing aid 102 and electronic device 120, hearing aid locator application 124 (which runs in the background on electronic device 120) causes processor 138 to retrieve the current time and the current location from clock 134 and position detection circuit 132 respectively. Hearing aid locator application 124 further causes processor 138 to update the hearing aid location and time data 126 with the current time and the current location each time electronic device 120 communicates with hearing aid 102. In one particular embodiment, electronic device 120 may be configured to check the connection of the communication channel with hearing aid 102 regularly. For example, some communication protocols provide wake up calls on regular intervals to maintain the connection of the communication channel.

In operation, electronic device 120 continues to update hearing aid location and time data 126 as long as the communication channel with hearing aid 102 is maintained. If electronic device 120 loses the communication channel with hearing aid 102, such as if the hearing aid leaves the range of transceiver 148. Electronic device 120 has a record of the last time and last location that electronic device 120 sent or received communication from hearing aid 102. If the reason electronic device 120 lost the communication channel is because the user dropped hearing aid 102 and hearing aid 102 has been moved out of communication range, electronic device 120 now has data related to the location the user dropped hearing aid 102 at stored in memory 122. In one instance, the user may realize that the hearing aid was dropped and access the hearing aid location and time data 126 to determine a rough location where electronic device 120 lost the communication link with hearing aid 102. In another instance, electronic device 120 may alert the user that the communication channel was lost causing the user to check to see if hearing aid 102 is still on the user's ear.

In another embodiment, electronic device 120 also records a time and a location in memory 122 corresponding to the time and location that electronic device 120 lost the communication channel with hearing aid 102. This allows electronic device 120 to provide the user with the last known location and time where the communication channel was lost in addition to the last known location and time that electronic device 120 communicated with hearing aid 102. Having both sets of time and location allows hearing aid locator application 124 to more accurately predict the actual location of hearing aid 102.

In another embodiment, electronic device 120 also provides the current time and current location to a server in communication with electronic device 120. This allows the user to access the hearing aid location and time data 126 from a second computing device. Accessing the hearing aid location and time data 126 from the second computing device is particularly helpful when hearing aid 102 and electronic device 120 have both become lost. For example, the motorcyclist is driving on a bumpy road and loses hearing aid 102 at which time electronic device loses communication with hearing aid 102 and the last known location and time are stored in memory 122 and on a server. Later the motorcyclist also loses electronic device 120. Nonetheless, the motorcyclist is able to locate hearing aid 102 by accessing hearing aid location and time data 126 from the server.

In the above discussion, system 100 is disclosed including electronic device 120 configured to execute a hearing aid locator application 124. However, various graphical user interfaces (GUI) may be configured for use on electronic device 120 for providing the user with the hearing aid location and time data 126. One example of a GUI including a road map is shown in FIG. 2.

Figure 2:
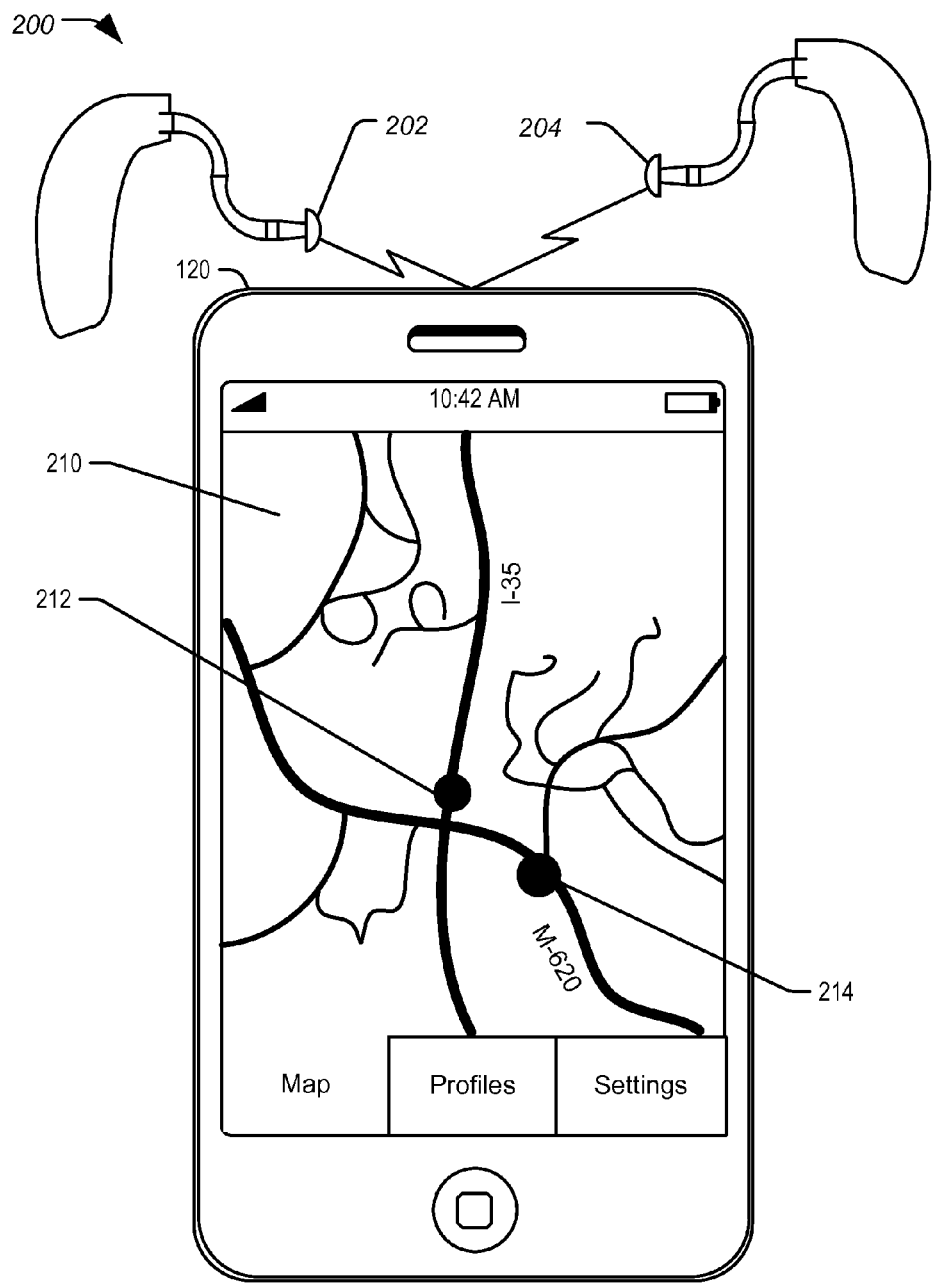
FIG. 2 is a pictorial diagram of an embodiment of a system including a graphical user interface of hearing aid locator application displayed as a map on the display interface of the electronic device of FIG. 1.

FIG. 2 is a pictorial diagram of an embodiment of a system 200 including a graphical user interface (GUI) 210 of hearing aid locator application 124 displayed as a map on display interface 146 of electronic device 120 of FIG. 1. System 200 includes left hearing aid 202 and right hearing aid 204 and electronic device 120 in wireless communication with left and right hearing aids 202 and 204. Electronic device 120 is depicted executing hearing aid locator application 124. Hearing aid locator application 124 includes a GUI 210 displayed on user interface 142. In the example shown, GUI 210 is a road map including areas 212 and 214, which depict the last known locations of left hearing aid 202 and right hearing aid 204 respectively.

In the example shown, the user has lost both their right and left hearing aids 202 and 204. Electronic device 120 had been executing hearing aid locator application 124 in the background and stored the last known location of left hearing aid 202 (area 212) and the last known location of right hearing aid 204 (area 214) in memory 122. The user realizing that he/she has lost left and right hearing aids 202 and 204 brings hearing aid locator application 124 to the foreground to display GUI 210 on user interface 142. GUI 210 displays the road map shown with areas 212 and 214 which generally indicate the last known locations of left and right hearing aids 202 and 204 respectively. Using areas 212 and 214 the user is able to locate the lost hearing aids 202 and 204.

It should be understood that, the road map shown is one possible GUI interface and that GUI 210 may also include additional information or different types of GUIs. For example, GUI 210 may also include address information, last known time and date data, GPS coordinates, user's current location data, directional information (such as arrows pointing in the direction of the last known location), multiple overlapping areas providing degrees of certainty as to the actual location of hearing aids 202 and 204, and other proximity data.

Figure 3:
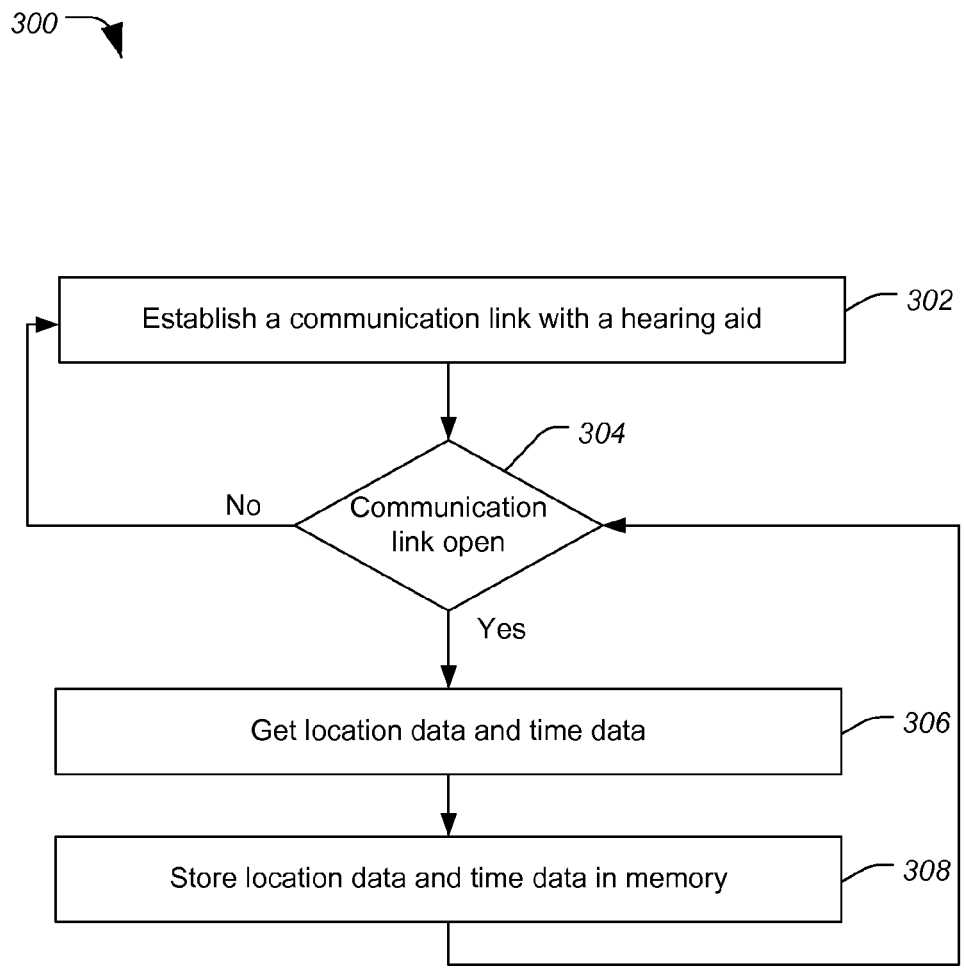
FIG. 3 is a flow diagram of an embodiment of a method of storing last known location and time data of a hearing aid.
Figure 4:
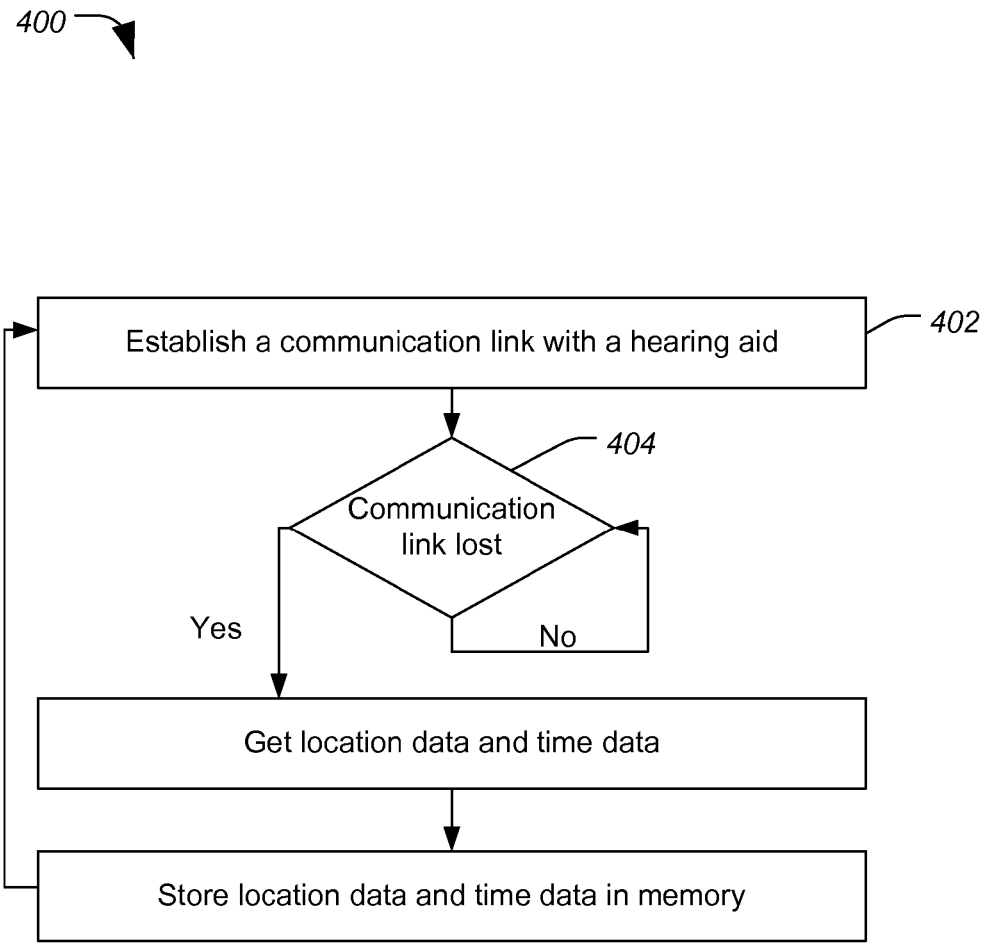
FIG. 4 is a flow diagram of a second embodiment of a method of storing last known location and time data of a hearing aid.

Hearing aid locator application 124 stores the last known location data of left and right hearing aids 202 and 204 in memory 122 and provides the data to GUI 210, at the request of the user. However, there are several different methods for when to store the last known location data. FIGS. 3 and 4 show two possible methods for determining when electronic device 120 stores the last known location data.

FIG. 3 is a flow diagram of an embodiment of a method 300 of storing last known location and time data of hearing aid 102. At 302, electronic device 120 establishes a communication link with hearing aid 102. Advancing to 304, electronic device 120 determines if the communication link is still open. If the communication link is closed method 300 returns to 302. If the communication link is open, method 300 proceeds to 306 and electronic device 120 gets location data and time data. For example, electronic device 120 includes a GPS and a clock and is able to determine the location data from the GPS and the time data from the clock. Moving to 308, electronic device 120 stores the location data and the time data in memory (such as memory 122) and returns to 304. At 304, electronic device 120 again determines if the communication link is still open and proceeds accordingly.

FIG. 3 shows method 300 which stores the location data and the time data in a loop as long as the communication link is open between electronic device 120 and hearing aid 102. FIG. 4 shows a second method 400 of storing the location data and time data.

FIG. 4 is a second flow diagram of an embodiment of a method 400 of storing last known location and time data of hearing aid 102. At 402, electronic device 120 establishes a communication link with hearing aid 102. Advancing to 404, electronic device 120 determines if the communication link is lost. If the communication link is open method 400 returns to 404. If the communication link is lost, method 400 proceeds to 406 and electronic device 120 determines the location data and time data. Moving to 408, electronic device 120 stores the location data and the time data in memory (such as memory 122) and returns to 402. At 402, electronic device 120 attempts to re-establish the communication link.

It should be understood, that method 300 and 400 may be combined to store both the last known location and time data that the communication link was open and the location and time data that the communication link was lost. This provides the user with additional information that may be used to narrow a search for a lost hearing aid to the area between the location that the communication link was open and the location where the communication link was lost.

Although the present invention has been described with reference to preferred embodiments, workers skilled in the art will recognize that changes may be made in form and detail without departing from the scope of the invention.

What is claimed is:

1. An electronic device comprising:
   one or more processors;
   a display;
   at least one transceiver coupled to the one or more processors and configurable to communicate with a hearing aid through a communication channel; and
   a non-transitory computer readable storage medium storing a hearing aid locator application that, when executed by the one or more processors, causes the one or more processors to:
   store location data generated while the electronic device is in communication with the hearing aid via the communication channel;
   in response to re-establishing the communication channel after a loss of the communication channel, measure a signal strength of the communication channel; and
   present, via the display, a visual indication of the signal strength.

2. The electronic device as recited in claim 1, wherein the visual indication of the signal strength is an indication of the closeness of the hearing aid to the electronic device.

3. The electronic device as recited in claim 1, wherein the hearing aid locator application, when executed by the one or more processors, further causes the one or more processors to re-establish the communication channel with the hearing aid.

4. The electronic device as recited in claim 3, wherein the electronic device outputs an audible sound in response to re-establishing the communication channel.

5. The electronic device as recited in claim 1, wherein the hearing aid locator application, when executed by the one or more processors, further causes the one or more processors to present the location data on the display.

6. The electronic device as recited in claim 5, wherein the location data is presented with respect to a map.

7. The electronic device as recited in claim 1, wherein the hearing aid locator application, when executed by the one or more processors, further causes the one or more processors to present time data associated with a last known location of the hearing aid on the display.

8. The electronic device as recited in claim 1, wherein the hearing aid locator application, when executed by the one or more processors, further causes the one or more processors to log time data associated with the hearing aid.

9. The electronic device as recited in claim 1, wherein the hearing aid locator application, when executed by the one or more processors, further causes the one or more processors to present a current location of the hearing aid.

10. A portable electronic device comprising:
    one or more processors;
    a user interface coupled to the one or more processors to receive inputs from a user and to provide information to the user;

a transceiver coupled to the one or more processors to communicate with the hearing aid through a communication channel;
a position detecting circuit coupled to the one or more processors; and
a non-transitory computer readable storage medium storing instructions that, when executed by the one or more processors, cause the one or more processors to:
 establish the communication channel with the hearing aid;
 store location data generated by the position detecting circuit while the electronic device is in communication with the hearing aid via the communication channel;
 monitor a signal strength of the communication channel, in response to reestablishing the communication channel after a disruption of the communication channel; and
 present, via the user interface, a visual indication representative of the signal strength.

11. The portable electronic device of claim 10, wherein the instructions, when executed by the one or more processors, further cause the one or more processors to present on the user interface a location associated with the location data.

12. The portable electronic device of claim 11, wherein the location is overlaid on a map.

13. The portable electronic device of claim 10, wherein the instructions, when executed by the one or more processors, cause the one or more processors to store the location data in response to the distribution of the communication channel.

14. The portable electronic device of claim 13, wherein the instructions, when executed by the one or more processors, further cause the one or more processors to log a time of the disruption of the communication channel.

15. A non-transitory computer readable storage medium storing instructions that, in response to execution by a processor of an electronic device, cause the electronic device to perform operations for interacting with a hearing aid, the operations comprising:
 storing location data generated while the electronic device is in communication with the hearing aid via a communication channel;
 in response to re-establishing the communication channel after a loss of the communication channel, measuring a signal strength of the communication channel; and
 presenting, via a display of the electronic device, a visual indication of the signal strength.

16. A method for locating a hearing aid via an electronic device, the method comprising:
 establishing a communication channel between the electronic device and the hearing aid;
 storing location data generated by the electronic device while the electronic device is in communication with the hearing aid via the communication channel;
 monitoring a signal strength of the communication channel, in response to reestablishing the communication channel after a disruption of the communication channel; and
 presenting, via the electronic device, a visual indication representative of the signal strength.

* * * * *